(No Model.)

L. NOELCKE.
ICE VELOCIPEDE.

No. 510,813.  Patented Dec. 12, 1893.

Attest—
C. W. Miles
T. Simmons

Inventor—
Louis Noelcke.
By Wood & Boyd Attys

UNITED STATES PATENT OFFICE.

LOUIS NOELCKE, OF CINCINNATI, OHIO, ASSIGNOR OF ONE-THIRD TO PETER BOEHMER, OF NEWPORT, KENTUCKY.

ICE-VELOCIPEDE.

SPECIFICATION forming part of Letters Patent No. 510,813, dated December 12, 1893.

Application filed October 9, 1893. Serial No. 487,664. (No model.)

*To all whom it may concern:*

Be it known that I, LOUIS NOELCKE, a citizen of the United States, residing at Cincinnati, in the county of Hamilton and State of Ohio, have invented certain new and useful Improvements in Velocipede-Sleds, of which the following is a specification.

My invention relates to a velocipede sled.

One of the objects of my invention is to provide a neat, strong and durable frame upon which the operating parts are mounted convenient for the manipulation of the rider.

The various features of my invention are fully set forth in the description of the accompanying drawings making a part of this specification, in which—

Figure 1:
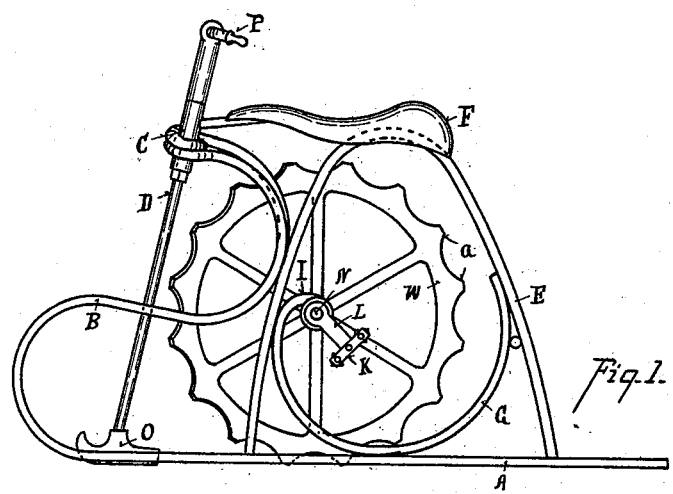
Figure 2:
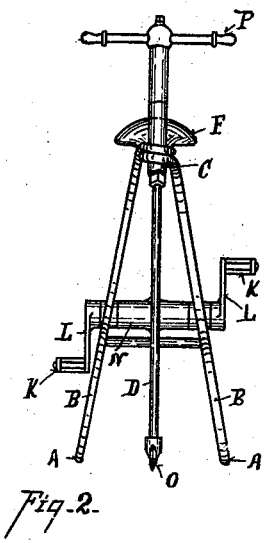

Figure 1 is a side elevation of my improvement. Fig. 2 is a front plan view.

The frame in the drawings is shown as made integral with the runners, and is the preferred form of construction.

A represents the longitudinal runners arranged one opposite the other and having their forward ends bent into the upwardly projecting bow B having at its upper extremity an eye to receive and support the sleeve C, in which journals the steering shaft D.

E represents bow-shaped standards attached to the runners on which is mounted the saddle F.

G represents circular braces.

I represents an eye formed in the brace G in which the axle of the wheel W journals.

K represents pedals on cranks L which project from the central shaft N.

O represents a steering runner attached to the lower end of shaft D.

P represents handles attached to the steering shaft for manipulating the runner O. The wheel W is provided with spurs $a$ which engage with the ice or snow between the runners for propelling the sled forward.

Mode of operation: The operator sits upon the saddle and with his feet upon the pedals drives the wheel and propels the sled forward upon the snow or ice; its direction is given by the steering runner O; it is stopped by turning the rudder half around which serves as a brake to stop the device.

Having described my invention, what I claim is—

1. A velocipede sled, consisting of the opposite runners A having their forward portions bent upwardly into a bow B having an eye at its upper extremity, a steering shaft D extending through said eye and having at its lower end a steering runner O located between the sled runners, a frame rising from the sled runners and provided with a rotary wheel W having spurs which act upon the ice between the opposite sled runners for propelling the sled, and a saddle supported above the wheel, substantially as described.

2. A velocipede sled, consisting of the opposite sled runners A provided with bows B which curve upward, rearward, and forward and have an eye at their upper extremity, a sleeve C supported by said eye, a steering-shaft D supported by the sleeve and having at its lower end a steering-runner O located between the sled-runners, a frame rising from the sled-runners and provided with a propelling wheel W having crank-pedals and acting on the ice between the sled-runners, and a saddle F arranged above the propelling wheel, substantially as described.

3. A velocipede sled, consisting of the opposite sled-runners A provided with bows B which curve upward, rearward, and forward, a steering-post supported by the bows and having at its lower end a steering-runner O arranged between the sled-runners, a bow-shaped standard E rising from the sled-runners, circular braces G supporting a propelling wheel W having crank-pedals and acting on the ice between the sled-runners, and a saddle F supported by the bow-shaped standard at a point above the propelling wheel, substantially as described.

In testimony whereof I have hereunto set my hand.

LOUIS NOELCKE.

Witnesses:
T. SIMMONS,
C. W. MILES.